(12) United States Patent
Linch

(10) Patent No.: US 9,701,394 B2
(45) Date of Patent: Jul. 11, 2017

(54) RESONANT BLADES USING AN APERTURE FOR CANCELLATION OF PROPELLER GENERATED NOISE

(71) Applicant: Northrop Grumman Systems Corporation, Falls Church, VA (US)

(72) Inventor: Jonathon J. Linch, Los Angeles, CA (US)

(73) Assignee: Northrop Grumman Systems Corporation, Falls Church, VA (US)

(*) Notice: Subject to any disclaimer, the term of this patent is extended or adjusted under 35 U.S.C. 154(b) by 331 days.

(21) Appl. No.: 14/631,403

(22) Filed: Feb. 25, 2015

(65) Prior Publication Data

US 2016/0244148 A1    Aug. 25, 2016

(51) Int. Cl.
*B64C 11/20* (2006.01)
*B64C 11/00* (2006.01)
(Continued)

(52) U.S. Cl.
CPC ............ *B64C 11/20* (2013.01); *B64C 11/00* (2013.01); *B64C 11/18* (2013.01); *B64C 21/02* (2013.01); *B64C 2220/00* (2013.01); *B64C 2230/14* (2013.01); *B64C 2230/24* (2013.01); *Y02T 50/166* (2013.01)

(58) Field of Classification Search
None
See application file for complete search history.

(56) References Cited

U.S. PATENT DOCUMENTS 4,726,548 A   2/1988  Clites
5,066,195 A * 11/1991  Dobrzynski ............ B64C 11/00
                                                  416/124
(Continued)

FOREIGN PATENT DOCUMENTS

WO    2012110267    8/2012

OTHER PUBLICATIONS

Sobolev, A. et al; Investigations of the noise suppressing system elements for passenger aircraft power plants; Aeroacoustics Conference (1996); AIAA Meeting Papers on Disc., May 1996; A9630798, AIAA Paper 96/1681; doi: 10.2514/6.1996-1681.
(Continued)

*Primary Examiner* — Paul Huber
(74) *Attorney, Agent, or Firm* — Patti & Malvone Law Group, LLC

(57) ABSTRACT

An exemplary apparatus minimizes an aircraft propeller noise having an associated frequency and a corresponding wavelength. A resonant tone produced on the propeller blade elicits a sound with substantially the same frequency as the associated frequency of the offending source. The resonant tone is powered by an inflow of air in or across an aperture of a resonant structure during the rotation of the blade and the aperture has an opening from which the sound is emitted. The resonant structure is dimensioned to generate a sound with substantially the same frequency as the offending source. The aperture is located on the blade with the opening a distance from a target origin of the noise that is substantially one half of the wavelength of the noise so that the sound arrives at the target origin of the noise substantially 180 degrees out of phase with the noise.

19 Claims, 3 Drawing Sheets

(51) Int. Cl.
  *B64C 11/18*    (2006.01)
  *B64C 21/02*    (2006.01)

(56) References Cited

U.S. PATENT DOCUMENTS

| | | |
|---|---|---|
| 5,217,349 A | 6/1993 | Succi |
| 6,368,059 B1 | 4/2002 | Maines |
| 6,948,906 B2 | 9/2005 | Leishman et al. |
| 2011/0142637 A1* | 6/2011 | Riddell ................ F03D 1/0633 416/62 |
| 2011/0211952 A1 | 9/2011 | Chouhan |
| 2015/0064003 A1* | 3/2015 | Drobietz .............. F03D 1/0641 416/1 |

OTHER PUBLICATIONS

Giacche, D. et al; Optimization of Bypass Outlet Guide Vane for Low Interaction Noise; AIAA Journal, vol. 52, No. 6, Jun. 2014, pp. 1145-1158; doi: 10.2514/1.J052003.
Boorsma, K. et al; Perforated Fairings for Bluff Body Noise Control; 13th AIAA/CEAS Aeroacoustics Conference (28th AIAA Aeroacoustics Conference) (2007); doi: 10.2514/6.2007-3462.

\* cited by examiner

RESONANT BLADES USING AN APERTURE FOR CANCELLATION OF PROPELLER GENERATED NOISE

BACKGROUND

This invention relates to minimizing noise sources generated by the rotation of a propeller in air.

There are a variety of aircraft propellers, each designed for particular applications and cruise speeds. Some aircraft can vary thrust from the propeller by changing the revolutions per minute (RPM) while maintaining constant collective pitch, whereas other aircraft generate different levels of thrust by keeping the propeller RPM constant and employing variable pitch blades. Of course, different propeller designs have a different number of blades.

FIG. 1 illustrates an exemplary propeller 105 having 6 blades 110 supported by a hub 115. One such propeller having 6 blades is used by the C-130J Hercules aircraft and has a diameter of 14 feet. The propeller of this aircraft is operated at a constant RPM with thrust controlled by varying the pitch of the blades.

Regardless of the types of propeller thrust mechanisms, rotation of an aircraft propeller generates noise due to displacement of air caused by the impingement of a blunt body (thickness noise) and pressure fluctuations due to lift and drag (loading noise). There are some tertiary effects; however thickness and loading noise are of primary concern.

FIG. 2 illustrates the directivity field of the two types of noise sources generated by propellers. An aircraft fuselage 205 includes a motor 210 connected by a shaft 215 to hub 220. A plurality of blades 225 are mounted to and rotate around the hub 220. Thickness noise 230 is caused by repeated fluid/air displacement by one or more rotating elements, i.e. blades 225 that are relatively blunt. The thickness noise 230 is generally centered in the plane of rotation and propagates radially outward away from the tips of the blades. Loading noise 235 is caused by the alternating lift/drag dipole with lift occurring at a given position with one of the blades being closest to that position and drag occurring at the given position when two adjacent blades are equidistant from the position. The loading noise 235 generally propagates perpendicularly away from the plane defined by the propeller blades.

Propeller generated noise is undesired. It is a nuisance for crew and passengers on many propeller driven commercial aircraft. Propeller noise is of equal to or greater importance in the military theater; however, ramifications of such noise has potentially serious consequences when military aircraft must operate in contested airspace where an enemy may discern the presence and/or location of such an aircraft due to perceived propeller noise. Because of this, penalties to efficiency and/or aerodynamic performance may be accepted in favor of a less detectable propulsion mechanism. Thus, minimizing propeller generated noise would be welcomed in both commercial and military communities.

SUMMARY

It is an object of the present invention to minimize aircraft generated propeller noise.

An exemplary apparatus minimizes an aircraft propeller noise having an associated frequency and a corresponding wavelength. A resonant tone produced on the propeller blade elicits a sound with the same frequency as the associated frequency of the offending noise source. The resonant tone is powered by an inflow of air in or across an aperture of a resonant structure during the rotation of the blade and the aperture has an opening from which the sound is emitted. The aperture and resonant structure is dimensioned to generate a sound with the same frequency as the associated frequency of the offending source. The aperture is located on the blade with the opening a distance from a target origin of the noise that is substantially one half of the wavelength of the noise so that the sound arrives at the target origin of the noise substantially 180 degrees out of phase with the noise resulting in destructive wavefront interference.

DESCRIPTION OF THE DRAWINGS

Features of exemplary implementations of the invention will become apparent from the description, the claims, and the accompanying drawings in which:

DETAILED DESCRIPTION

Figure 1:
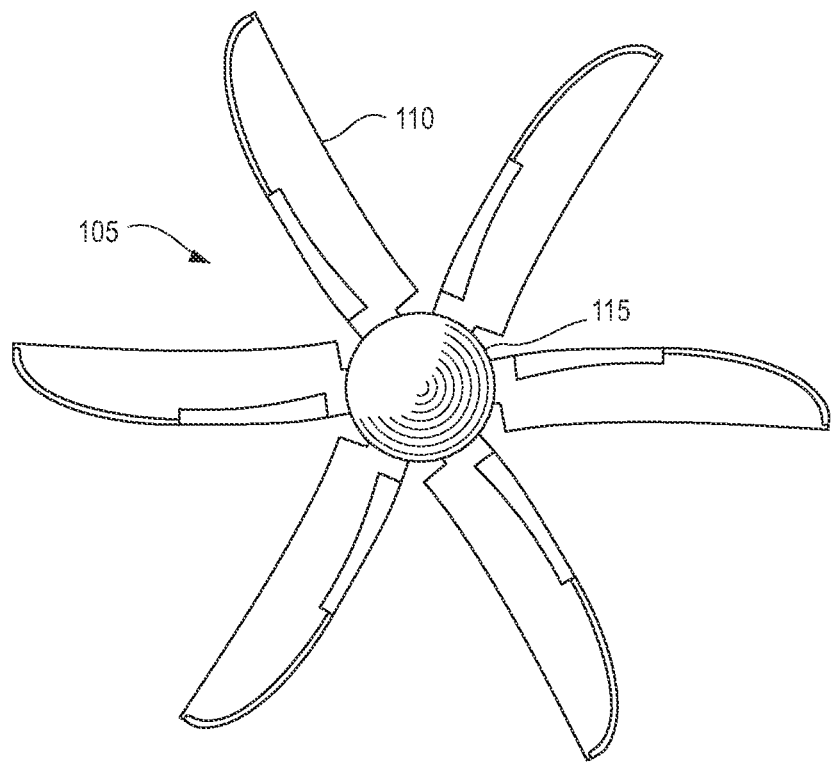
FIG. 1 is a block diagram of FIG. 1 illustrates an exemplary propeller.
Figure 2:
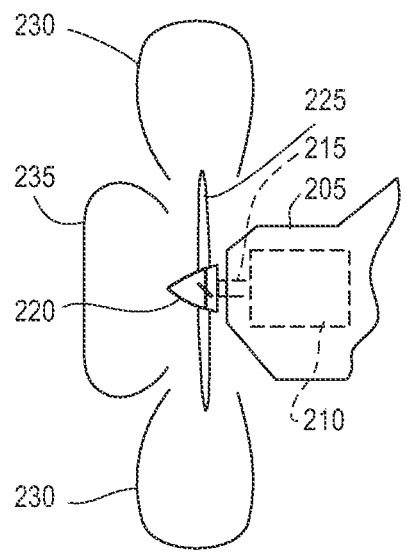
FIG. 2 demonstrates primary components of propeller noise and their affiliated directivity.
Figure 3:
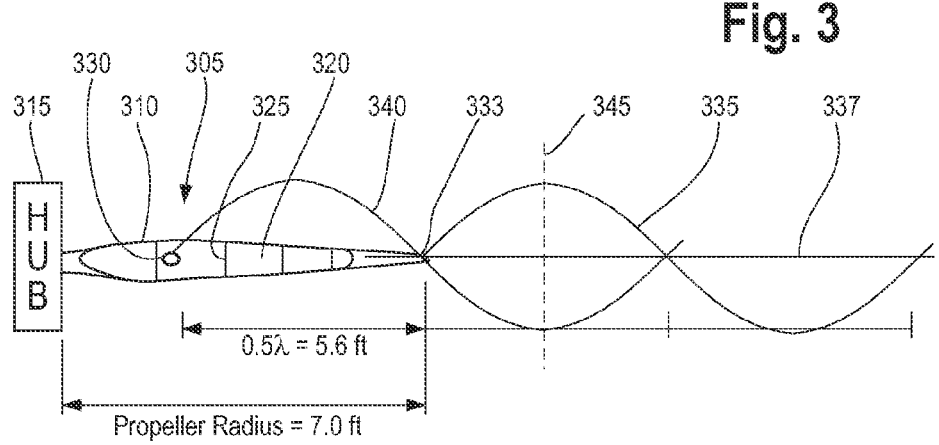
FIG. 3 illustrates an embodiment in accordance with the present invention for minimizing propeller noise.

FIG. 3 illustrates an embodiment 305 of the present invention showing a representative blade 310 that is illustrative of each of similar blades employed on an exemplary propeller. Each of the blades is attached to and supported by hub 315. The blade 310 has an interior portion 320 that is hollow and confined within solid exterior surfaces of the blade. In order to provide additional strength, braces 325 extend across the hollow portions and reinforce the rigidity and strength of the outer portions of the blade. The braces 325 are configured so as to not substantially impede the flow of air in the hollow region 320. An aperture 330 in the exterior surface of the blade connects the interior hollow region 320 with the external environment outside of the blade. As will be explained in more detail below, the aperture 330 and the hollow region 320 cooperate to produce a sound due to air passing over the aperture 330 during the rotation of the blades 310. The sound is produced in the same way that sound is produced by blowing air across the mouth of an empty bottle. This sound producing structure is one example of a class of sound producing devices known as a resonator or whistle.

In this illustrated example, the thickness noise caused by the rotation of blade 310 originates from the tip 333 of the blade, i.e. the tip is the noise origination target, and has a fundamental wavelength indicated by sinewave 335 shown centered about the center line 337 of the blade. As used herein, "noise" refers to sounds within the range of normal human hearing and "fundamental" wavelength/frequency of the noise refers to the number of blades multiplied by the angular velocity of those blades. In accordance with this embodiment of the present invention, the dimensions associated with aperture 330, the length of the passage (neck) connecting the aperture 332 the hollow interior 320, and the volume defined by the hollow interior 320 are selected so that the sound that originates at the aperture 330 has a fundamental wavelength represented by sinewave 340 that is equal to the wavelength associated with the thickness noise. The length from the center of aperture 330 to the wing tip 333 is selected such that sinewave 340 is substantially 180° out of phase with the sinewave 335. As seen at position 345 the amplitude of sinewave 340 is equal but opposite to the amplitude of sinewave 345 causing the resulting combination of these two sounds/signals to cancel via destructive interference, thereby substantially minimizing, or in an ideal case eliminating, the thickness noise component caused by the rotation of blade 310. As used herein "substantially equal" means plus or minus 10% of exact equality.

The exemplary embodiment of FIG. 3 may be better understood by reference to a specific example. Assume that blade 310 represents a blade of a propeller of the C-130J. Hercules aircraft. This propeller is 14 feet in diameter and operates at a substantially constant propeller speed of 1020 rpm. Blade passage frequency (BPF) equals the rpm of the propeller multiplied by the number (n) of blades divided by 60. The exemplary propeller has a BPF of 102 Hz, i.e. 1020 rpm×6 blades divided by 60.

The wavelength of a sound equals the speed of the sound divided by the frequency of the sound. The speed of sound in air can be assumed to be approximately 1140 ft./s. The frequency of the sound associated with thickness noise is the BPF. Therefore, the wavelength of the thickness noise in this example is 11.18 feet determined by dividing 1140 ft./s by 102 Hz (hertz representing the reciprocal of time in seconds). Thus, to cancel the thickness noise, the aperture 330 should be 0.5 wavelength (180°) from the point of origination of the thickness noise, i.e. the blade tip 333. Since one wavelength in this example has been determined to be 11.18 feet, 0.5 wavelength is approximately 5.6 feet which determines the distance of aperture 330 from the wing tip 333.

The resonant frequency created by air moving across an aperture of a hollow vessel can be determined by the Helmholtz equation in which the resonant frequency (f) is determined by the equivalent length ($L_n$) of the neck extending between the opening and a cavity, the cross-sectional area of the neck (and normally the area of the opening) (A), and the volume (V) of the cavity. The equation using these parameters, and the speed of sound (c), is:

$$f = \frac{c}{2\pi}\sqrt{\frac{A}{VL_n}}$$

For the example described in FIG. 3, f=102 Hz. Based on this formula, the combination of the variable parameters A, $L_n$, and V should be selected so that the equation is satisfied for the desired value of frequency. For this example, the combination of variables to result in f=102 Hz could be: A=0.005 ft² (about 1 inch diameter), $L_n$=0.066 ft (about 0.79 inches) and V=0.24 ft³ (about 6.8 liters). It will be apparent to those skilled in the art based on the description herein that different values of each parameter could be used as long as the combination results in the desired frequency and assuming that the values are practical in view of dimensions of the propeller blade and materials used for the blade.

Figure 4:
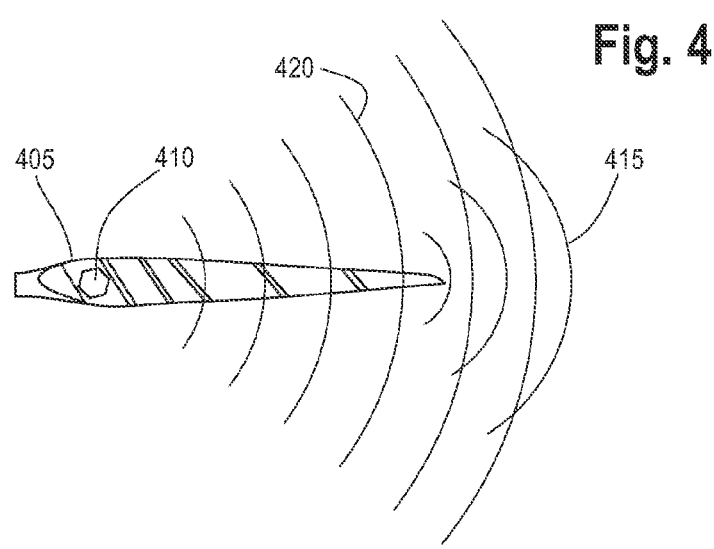
FIG. 4 illustrates how the embodiment shown in FIG. 3 reduces noise.

FIG. 4 is another representation of a similar embodiment to that described in FIG. 3. A blade 405 includes an aperture 410 that provides an opening to access a hollow portion of the blade. Sound waves 415 represent illustrative parts of thickness noise propagating outwardly from the tip of the blade. Sound waves 420 represent illustrative parts of sounds produced at the aperture 410 that also propagate outwardly. Preferably, the amplitude of the sound waves 415 and 420 are substantially equal at the tip of the blade with sound waves 420 being 180° out of phase with sound waves 415 so that the amplitudes cancel, thereby reducing if not eliminating the perceived thickness noise.

Figure 5:
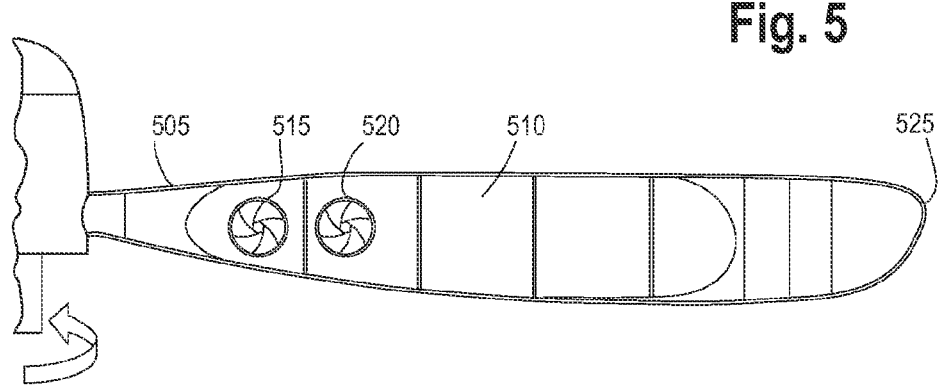
FIG. 5 illustrates another embodiment in accordance with the present invention for minimizing propeller noise.

FIG. 5 shows another embodiment in accordance with the present invention. A blade 505 includes a hollow portion 510 as well as a first adjustable aperture 515 and a second adjustable aperture 520. These apertures may consist of a plurality of movable segments in a concentric arrangement similar to the aperture of a camera. The apertures enable the control of the area of the opening and hence provide control of the frequency of sounds produced in accordance with the Helmholtz equation. It will be noted that the center of apertures 515 and 520 are disposed along the longitudinal centerline of blade 505, and are located at different lengths from the tip of the blade.

The different frequency sounds produced by apertures 515 and 520 can be used in different ways to minimize undesired noise produced by the propeller. In a first example, aperture 515 is located 0.5 wavelengths from the tip 525 of the blade and is adjusted to produce a sound having a frequency equal to the blade passage frequency to produce a sound wave having a phase suited for canceling the thickness noise. Aperture 520 is located approximately 0.5 wavelengths from the approximate center of origin of the loading noise, which is along a centerline of the hub perpendicular to the plane of the blades. The aperture 520 may be adjusted to produce a sound having a frequency equal to the loading noise frequency and having a phase suited for canceling this noise. In this example, both the thickness noise and the loading noise are minimized by corresponding out of phase sounds produced by the respective apertures.

Figure 6:
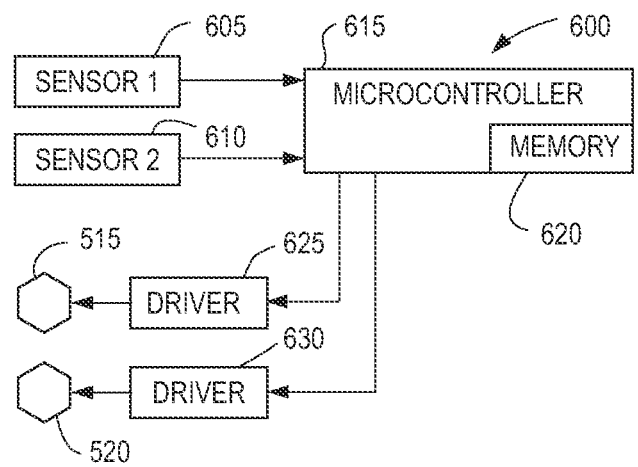
FIG. 6 is a block diagram illustrating circuitry associated with the embodiment shown in FIG. 5.

FIG. 6 is a block diagram of an exemplary mechanism 600 that can be used to adjust the openings controlled by apertures 515 and 520 in the embodiment shown in FIG. 5. A first sensor 605 and a second sensor 610 are used to sense parameters that can be used to determine the appropriate frequencies to be produced by the sounds generated from the respective apertures in order to produce sound waves to minimize the respective noise targets of each. For example, the parameters sensed may be the actual frequency of the noise source itself. Alternatively, the frequency of the noise source may be known to be proportional to another parameter, e.g. RPM of the propeller, pitch of the propeller blades, etc., so that the frequency of the noise source can be computed based on the sensing of the associated parameter. A microcontroller 615 receives the inputs from the sensors 605 and 610. The microcontroller includes memory 620, a microprocessor and input/output interfaces. The memory 620 may, for example, store a table of values that correlates the parameters sensed by the sensors to a corresponding area required by the apertures 515 and 520 in order to produce a sound having an appropriate frequency suited for cancellation of the target undesired noise source. The microcontroller 615 generates outputs coupled to each of drivers 625 and 630 which are coupled respectively to apertures 515 and 520. The drivers accept electrical signals that are converted to corresponding mechanical movement causing the contraction or expansion of the apertures to control area.

Figure 7:
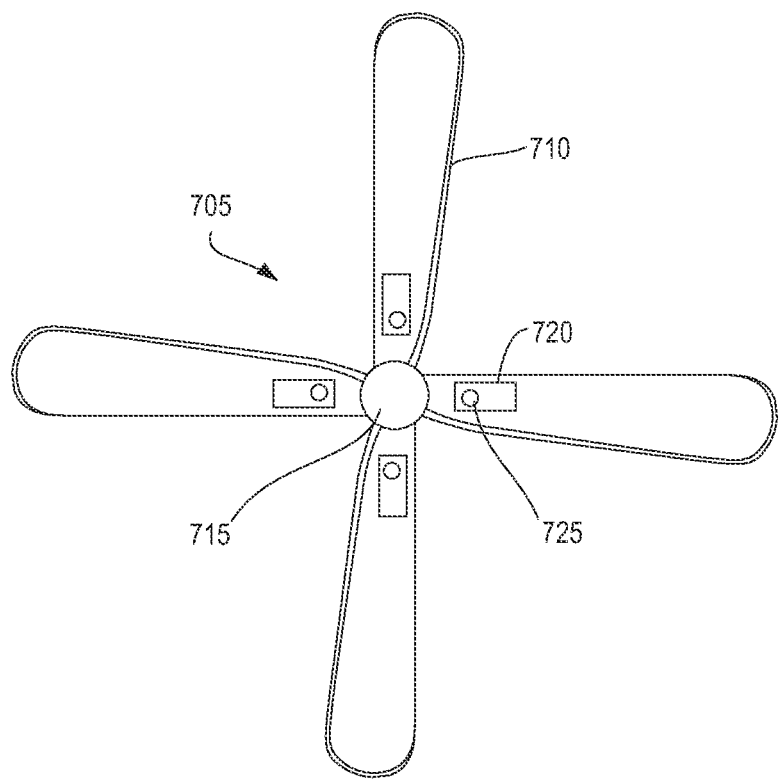
FIG. 7 shows a further embodiment in accordance with the present invention for minimizing propeller noise.

FIG. 7 shows another embodiment 705 of a propeller which includes noise minimization in accordance with the present invention. Propeller blades 710 are supported by the central hub 715 through which rotational drive is provided to the blades. A sound producing apparatus 720 is disposed on each of blades 710. The apparatus 720 may be an external structure secured to each wing or may be fabricated as part of the blade. Each apparatus 720 includes an aperture 725 which may either have a fixed area or a controllable area such as explained with regard to the above embodiment. Aperture 725 is preferably spaced 0.5 wavelengths from the source of the noise to be canceled. In this embodiment the blades 710 are not hollow. The apparatus 720 can have any convenient shape within the constraints that the frequency of the sound produced is substantially equal to the frequency of the target noise to be minimized. And, of course, the shape of apparatus 720 must take into consideration the aerodynamic forces and strive to minimize any adverse impact to the ability of the propeller to provide thrust.

In accordance with embodiments of the present invention, the sound generated to minimize a target noise is passively generated, i.e. the sound is produced only by the flow of air about the blade without requiring a further source of energy. An alternative embodiment could utilize other types of aerodynamic resonance or whistles to generate a noise canceling sound, e.g. resonance configured similar to a pipe organ, flute, a police or referee whistle, monopole or dipole whistles, etc. These are all similar in that each is capable of passively generating a sound.

Although exemplary implementations of the invention have been depicted and described in detail herein, it will be apparent to those skilled in the art that various modifications, additions, substitutions, and the like can be made without departing from the spirit of the invention. For example, a plurality of spaced apart apertures may be disposed along the wing where each aperture is designed to produce a sound with a different frequency in order to cancel different noise sources and/or cancel a series of noise sounds based on harmonics of a single noise source having a fundamental frequency. Where more than one aperture is utilized, each aperture may be associated with the same common volume within the blade or may be associated with independent, separate volumes. Apertures may be located at locations other than the centerline of the wing, such as concentric disposed around the wing or disposed in a spiral or non-linear pattern along the blade in order to generate sounds with wavefronts that better align with the corresponding wavefronts of the target sounds to be canceled.

The scope of the invention is defined in the following claims.

The invention claimed is:

1. An apparatus for minimizing noise generated by blades of an aircraft propeller where the noise has a target origin and an associated frequency with a corresponding wavelength, the apparatus comprising:
   a mechanism disposed on the blade that produces a sound having a first frequency that is substantially the same frequency as the associated frequency of the noise;
   an aperture defining an opening that is part of the mechanism;
   a hollow vessel that is part of the mechanism, the aperture connected to the hollow vessel having a first volume, the aperture disposed so that air flows over it and into the hollow vessel during the rotation of the blade;
   the area of the opening of the aperture and the first volume of the hollow vessel each contributing to controlling the first frequency of the sound;
   the aperture located a distance from the target origin of the noise that is substantially one half of the wavelength of the noise so that the sound arrives at the target origin of the noise substantially 180 degrees out of phase with the noise.

2. The apparatus of claim 1 wherein the hollow vessel is a hollow interior portion of the blade and the aperture extends from the exterior of the blade to the interior portion.

3. The apparatus of claim 1 wherein the aperture is adjustable to control the area of the opening.

4. The apparatus of claim 3 wherein the mechanism comprises a control apparatus that includes a sensor that senses a parameter proportional to the associated frequency of the noise and produces a corresponding electrical output, a conversion apparatus receives the electrical output and converts the value of the electrical output into a control signal coupled to and used by the aperture to control the area of the opening.

5. The apparatus of claim 1 wherein the mechanism includes another aperture for generating another sound having a second frequency that is substantially the same frequency as the associated frequency of a second noise, the another aperture located a distance from a second target origin of the second noise that substantially one half of the wavelength of the second noise so that the another sound arrives at the second target origin of the second noise substantially 180 degrees out of phase with the second noise.

6. The apparatus of claim 1 wherein the mechanism is separate from and mounted to the blade.

7. The apparatus of claim 1 wherein the mechanism is formed as part of the structure of the blade.

8. The apparatus of claim 1 wherein the associated frequency of the noise is the fundamental frequency of the noise.

9. The apparatus of claim 1 wherein the propeller has a plurality of blades and each blade of the propeller includes a corresponding mechanism.

10. The apparatus of claim 1 wherein the target origin is thickness noise originating at the tip of the wing.

11. The apparatus of claim 1 wherein the target origin is loading noise located forward of a hub to which the blade is mounted.

12. An apparatus for minimizing noise generated by blades of an aircraft propeller where the noise has a target origin and an associated frequency with a corresponding wavelength, the apparatus comprising:
    a whistle on the blade that produces a sound having a first frequency that is substantially the same frequency as the associated frequency of the noise;
    the whistle powered by an inflow of air during the rotation of the blade and having an opening from which the sound is emitted;
    the whistle dimensioned to generate the first frequency of the sound;
    the whistle located on the blade with the opening a distance from the target origin of the noise that is substantially one half of the wavelength of the noise so that the sound arrives at the target origin of the noise substantially 180 degrees out of phase with the noise.

13. The apparatus of claim 12 wherein the whistle comprises an aperture that is adjustable to control the area of the opening.

14. The apparatus of claim 12 wherein the whistle is separate from and mounted to the blade.

15. The apparatus of claim 12 wherein the whistle is formed as part of the structure of the blade.

16. The apparatus of claim 12 wherein the associated frequency of the noise is the fundamental frequency of the noise.

17. The apparatus of claim 12 wherein the propeller has a plurality of blades and each blade of the propeller includes a corresponding whistle.

18. The apparatus of claim 12 wherein the target origin is thickness noise originating at the tip of the wing.

19. The apparatus of claim 12 wherein the target origin is loading noise located forward of a hub to which the blade is mounted.

* * * * *